United States Patent [19]

Meininger et al.

[11] Patent Number: 4,725,675
[45] Date of Patent: Feb. 16, 1988

[54] WATER-SOLUBLE PHENYL-AZO-NAPHTHYL COMPOUNDS, SUITABLE AS DYESTUFFS, CONTAINING A CHLORO-TRIAZINYLAMINO GROUP AND A FIBER-REACTIVE GROUP OF THE VINYLSULFONE TYPE

[75] Inventors: Fritz Meininger, Frankfurt am Main; Joachim Otten, Offenbach am Main, both of Fed. Rep. of Germany

[73] Assignee: Hoechst Aktiengesellschaft, Frankfurt am Main, Fed. Rep. of Germany

[21] Appl. No.: 558,548

[22] Filed: Dec. 5, 1983

Related U.S. Application Data

[63] Continuation of Ser. No. 417,664, Sep. 13, 1982, abandoned, which is a continuation of Ser. No. 212,809, Dec. 4, 1980, abandoned.

[30] Foreign Application Priority Data

Dec. 6, 1979 [DE] Fed. Rep. of Germany ....... 2949034

[51] Int. Cl.⁴ .................... C09B 62/085; C09B 62/45; C09B 62/51; D06P 3/10
[52] U.S. Cl. .................................. 534/638; 534/582; 534/598; 534/617; 534/642; 534/887
[58] Field of Search ............................ 260/153, 146 T; 534/617, 638, 642

[56] References Cited

U.S. PATENT DOCUMENTS

| | | | |
|---|---|---|---|
| 3,440,240 | 4/1969 | Kuhne et al. ................. | 260/153 X |
| 3,544,547 | 12/1970 | Crabtree et al. ............... | 260/146 T |
| 4,046,754 | 9/1977 | Meininger et al. .............. | 260/162 |

FOREIGN PATENT DOCUMENTS

| | | | |
|---|---|---|---|
| 0021105 | 7/1981 | European Pat. Off. ........... | 260/153 |
| 1133051 | 7/1962 | Fed. Rep. of Germany ...... | 260/153 |
| 1265698 | 7/1963 | Fed. Rep. of Germany ...... | 260/153 |
| 38-23287 | 11/1963 | Japan ......................... | 260/153 |
| 985481 | 7/1961 | United Kingdom ............. | 260/146 T |

OTHER PUBLICATIONS

Stefniak, Chemical Abstracts, vol. 78, #148950r (1973).

*Primary Examiner*—Floyd D. Higel
*Attorney, Agent, or Firm*—Curtis, Morris & Safford

[57] ABSTRACT

Water-soluble azo compounds of the formula (1)

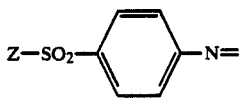

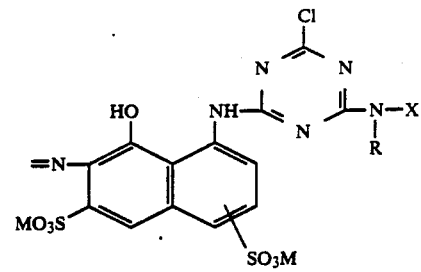

in which R is hydrogen or alkyl of 1 to 4 carbon atoms, X is alkyl of 1 to 6 carbon atoms substituted by carboxy or sulfo, or is phenyl substituted by 1 or 2 sulfo or carboxy or both, and Z is vinyl, β-thiosulfatoethyl or β-sulfatoethyl and M is hydrogen or the equivalent of a metal, and in which the second sulfo group in the naphthalene is bonded in the m-position or p-position relative to the acylated amino group. The new azo compounds are very valuable dyestuffs having fiber-reactive properties, and give color-fast and deep dyeings and prints on fiber materials made of cellulose or synthetic or natural polyamide fibers.

5 Claims, No Drawings

WATER-SOLUBLE PHENYL-AZO-NAPHTHYL COMPOUNDS, SUITABLE AS DYESTUFFS, CONTAINING A CHLORO-TRIAZINYLAMINO GROUP AND A FIBER-REACTIVE GROUP OF THE VINYLSULFONE TYPE

This application is a continuation of application Ser. No. 417,664, filed Sept. 13, 1982, now abandoned, which is a continuation of application Ser. No. 212,809, filed Dec. 4, 1980, now abandoned.

The invention relates to the industrial field of fiber-reactive dyestuffs.

Azo dyestuffs which contain a fiber-reactive radical from the vinyl sulfone series and, as a further fiber-reactive radical, a chlorotriazinyl radical are known from German specification No. 1,265,698. However, the dyestuffs described in this patent specification have certain deficiencies, so that they no longer sufficiently fulfil present requirements.

New azo compounds which correspond to the general formula (1) have now been found

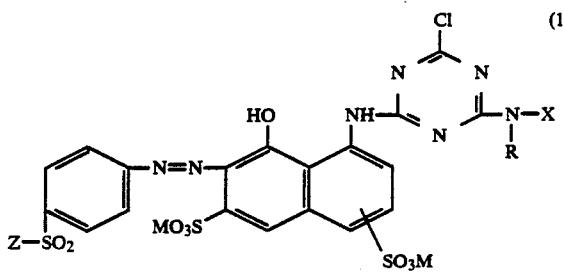

In which M is hydrogen or an equivalent of a metal, R is a hydrogen atom or an alkyl group with 1-4 C atoms, such as the ethyl group and, preferably, the methyl group; X is an alkyl group which has 1 to 6 C atoms, in particular 1 to 4 C atoms, such as, preferably, the methyl or ethyl group, and which is substituted by a sulfonic acid group or a carboxylic acid group, or is a phenyl radical, which is substituted by one or two sulfonic acid groups and/or carboxylic acid groups; Z represents the vinyl group or, preferably, the β-thiosulfatoethyl group, or particularly preferably the β-sulfatoethyl group; and the second sulfo group in the naphthalene radical is in the m-position or p-position relative to the acylated amino group.

The new azo compounds can be either in the form of the free acid or in the form of their salts. They are preferably in the form of the salts, in particular neutral salts, such as, for example, their alkali metal salts and alkaline earth metal salts, thus, for example, the sodium, potassium or calcium salts. They are preferably used in the form of the salts, in particular in the form of the alkali metal salts, for dyeing (in this context in the general sense, including printing) material, in particular fiber material, containing hydroxy groups or carbonamide groups, and leather.

In the compounds of the general formula (1), the radical X is preferably the β-sulfo-ethyl, carboxymethyl, monosulfophenyl, 2,5-disulfophenyl or monocarboxy-phenyl group. In particular, in the compounds of the general formula (1) the grouping of the formula —NR—X is a radical of the formula (in form of the free acid)

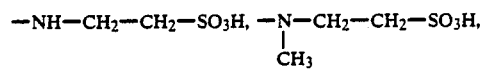

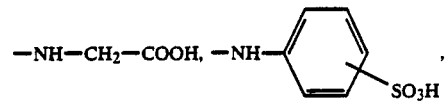

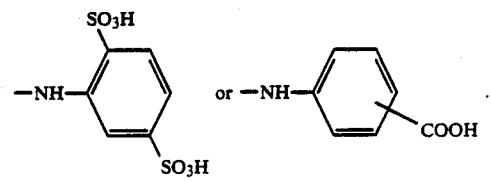

Furthermore, representatives of the azo compounds of the general formula (1) which are particularly interesting from an industrial point of view are those in which the radical X represents a sulfophenyl radical and the second sulfo group in the naphthalene radical is bonded in the m-position relative to the acylated amino group.

The present invention furthermore relates to a process for the preparation of these new compounds of the general formula (1) and their salts.

According to the invention, they can be prepared by coupling a diazonium compound of an amine of the general formula (2)

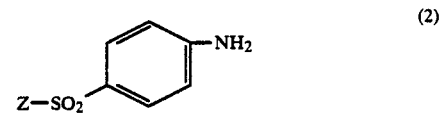

in which Z has the abovementioned meaning, with a coupling component of the general formula (3)

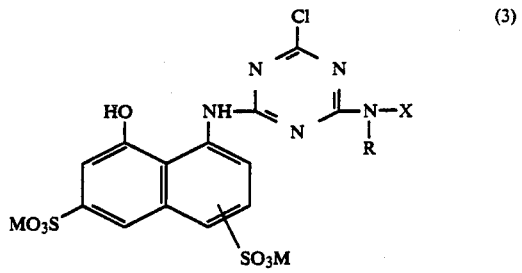

in which R, M and X have the above meanings and the second sulfo group in the naphthalene radical is in the m-position or p-position relative to the acylated amino group.

The new compounds can furthermore be prepared by coupling a diazonium compound of the general formula (2) mentioned and defined above with a compound of the general formula (4)

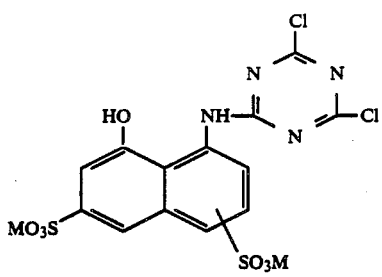

in which M has the abovementioned meaning and in which the second sulfo group in the naphthalene radical is in the m-poosition or p-position relative to the acylated amino group, and reacting the azo compound thus prepared, of the general formula (6) below, with a primary or secondary amine of the general formula (5)

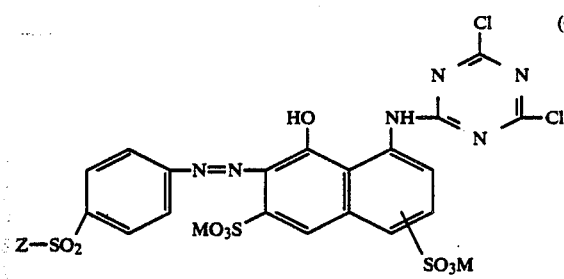

in which R, M, X and Z have the above meanings and the second sulfo group is in the m-position or p-position. Compounds of the general formula (1) in which Z represents the β-thiosulfato radical can also be prepared, according to the invention, by reacting a compound of the general formula (1) in which Z represents the vinyl radical with a salt of thiosulfuric acid, such as, for example, with sodium thiosulfate, by a procedure which is in itself known, the reaction preferably being carried out in aqueous solution and at a pH value of 4 to 6.5 and a temperature of 10° to 40° C.

The diazotization of the aromatic amine of the general formula (2) can be carried out by a procedure analogous to known procedures which are in themselves customary; it should be ensured that the aromatic amine as the starting compound or the diazonium compound thereof is not subjected to relatively strongly alkaline conditions, in order to avoid damage to the fiber-reactive group; the pH value of the medium in which these compounds are dissolved or suspended is advantageously kept below 7.5. The coupling reaction of the diazotized amine of the general formula (2) with a compound of the general formula (3) or (4) can likewise be carried out by known methods for the coupling reaction of diazotized anilines with acylamino-naphthols. In this case also, alkaline conditions are avoided; the coupling is preferably carried out in a pH range between 4 and 7 and at a temperature between −5° C. and +30° C.

The coupling components of the general formula (4) can be prepared by reacting 1-amino-8-naphthol-3,6- or -4,6-disulfonic acid with cyanuric chloride by a procedure analogous to procedures such as are described, for example, in W. F. Beech, Fibre-Reactive Dyes, London (1970), page 152, or K. Venkataraman, Synthetic Dyes, volume VI, New York (1972), page 262, and in British Pat. specification No. 785,222 or in German specification No. 1,062,367.

The coupling components of the general formula (3) can be synthesized by reaction of a compound of the general formula (4) with a compound of the general formula (5) by a procedure analogous to known procedures, which are in themselves customary, for the reaction of an amino compound with a dichlorotriazine, thus, for example, in an aqueous medium at a temperature between 5° and 70° C., preferably between 20° and 40° C., and at a pH value between 3 and 7.5, preferably between 4 and 7.

The reaction, according to the invention, of the azo compound of the general formula (6) with the amine of the general formula (5) can be carried out in a similar manner or the same manner. In this case also, the reaction is preferably carried out in an aqueous medium at a temperature between 10° and 80° C., preferably between 20° and 60° C., and at a pH value between 3 and 7, preferably between 4 and 7.

The compounds prepared according to the invention are separated out by generally known methods, either by precipitation from the reaction medium by means of electrolytes, such as, for example, sodium chloride or potassium chloride, or by evaporation of the reaction solution, for example by spray-drying, it being possible to add a buffer substance to this reaction solution.

The new compounds of the general formula (1) according to the invention have fiber-reactive properties and very good dyestuff properties. They can therefore be used for dyeing the abovementioned materials. Thus, it is also possible for the solutions obtained in the synthesis of the compounds according to the invention to be put to tinctorial use, directly as a liquid preparation, if appropriate after adding a buffer substance and if appropriate after concentrating the solutions.

The present invention thus also relates to the use of the azo compounds of the general formula (1) according to the invention for coloring materials containing hydroxy groups or carbonamide groups and to processes for their application to these substrates. This also includes bulk dyeing, for example of polyamide films, and dyeing by printing. The materials are preferably used in the form of fiber materials, in particular in the form of textile fibers, such as yarns, wound packages and fabrics.

Materials containing hydroxy groups are natural or synthetic materials containing hydroxy groups, such as, for example, cellulose fiber materials or regenerated products thereof and polyvinyl alcohols. Cellulose fiber materials are preferably cotton, but also other vegetable fibers, such as linen, hemp, jute and ramie fibers; regenerated cellulose fibers are, for example, viscose staple and filament viscose.

Materials containing carbonamide groups are, for example, synthetic and natural polyamides and polyurethanes, in particular in the form of fibers, for example wool and other animal hair, silk, leather, polyamide 6,6 polyamide 6, polyamide 11 and polyamide 4.

The dyestuffs according to the invention can be applied to, and fixed onto, the substrates mentioned, in particular the fiber materials mentioned, by the application techniques known for water-soluble dyestuffs, in particular for fiber-reactive dyestuffs.

Thus, using these dyestuffs, very good color yields and an excellent build-up of color are obtained on cellulose fibers in the exhaustion process from a long-liquor bath in the presence of an acid-binding agent and, if appropriate, neutral salts, such as sodium chloride or sodium sulfate. Dyeing is carried out at temperatures between 60° and 105° C., if appropriate at temperatures of up to 120° C. under pressure, and if appropriate in the presence of customary dyeing auxiliaries, in an aqueous bath. A procedure can be followed in which the material is introduced into the warm bath, the bath is warmed gradually to the desired dyeing temperature and the dyeing process is brought to completion at this temperature. If desired, the neutral salts, which accelerate the absorption of the dyestuff, can also be added to the bath only after the actual dyeing temperature has been reached.

Excellent color yields and a very good build-up of color are likewise obtained on cellulose fibers by the padding process, it being possible for the dyestuff to be fixed in the customary manner by batching at room temperature or elevated temperature, for example up to about 60° C., by steaming or with dry heat.

Deep prints with a good sharpness of contours and a clear white ground are likewise obtained by the customary printing processes for cellulose fibers, which can be carried out as a one-phase process, for example in the presence of sodium bicarbonate or another acid-binding agent in the printing paste and by subsequent steaming at 100° to 103° C., or as a two-phase process, for example by printing wit a neutral or weakly acid printing ink and then either by passing the material through a hot electrolyte-containing alkaline bath or by overpadding the material with an alkaline electrolyte-containing padding liquor, and subsequently batching this treated material or subsequently steaming it or subsequently treating it with dry heat. The quality of the prints is only slightly dependent on varying fixing conditions. Both in dyeing and in printing, the degrees of fixing obtained with the compounds according to the invention are very high.

In the case of fixing by means of dry heat by the customary thermofixing processes, hot air at 120° to 200° C. is used. Besides the customary steam at 101° to 103° C., it is also possible to employ superheated steam and pressurized steam at temperatures of up to 160° C.

The acid-binding agents, which effect fixing of the dyestuffs on the cellulose fibers, are, for example, water-soluble basic alkali metal and also alkaline earth metal salts of inorganic or organic acids, or compounds which liberate alkali under the influence of heat. Alkali metal hydroxides and alkali metal salts of weak to medium-strength inorganic or organic acids may be mentioned in particular, the sodium and potassium compounds preferably being meant by alkali metal compounds. Such acid-binding agents are, for example, sodium hydroxide, potassium hydroxide, sodium carbonate, sodium bicarbonate, potassium carbonate, sodium formate, sodium dihydrogen phosphate, disodium hydrogen phosphate, sodium trichloroacetate, waterglass or trisodium phosphate.

The compounds (dyestuffs) according to the invention are bonded chemically to the cellulose fibers by treating them with the acid-binding agent, if necessary under the influence of heat; in particular, after the customary after-treatment by rinsing to remove non-fixed portions of dyestuff, the cellulose dyeings have excellent fastness to wet processing, especially since non-fixed portions of dyestuff can easily be washed out because of their good solubility in cold water.

Dyeing on polyurethane fibers and polyamide fibers is usually carried out from an acid medium. Thus, for example, acetic acid and/or ammonium sulfate and/or acetic acid and ammonium acetate or sodium acetate can be added to the dyebath in order to obtain the desired pH value. It is advisable to add customary levelling auxiliaries, such as, for example, those based on a reaction product of cyanuric chloride and 3 times the molar amount of an aminobenzenesulfonic acid and/or an aminonaphthalenesulfonic acid and/or based on a reaction product of, for example, stearylamine and ethylene oxide, for the purpose of achieving a useful levelness of the dyeing. As a rule, the material to be dyed is introduced into the bath at a temperature of about 40° C. and agitated in the bath for some time, the dyebath is then subsequently adjusted to the desired weakly acid pH, preferably by means of acetic acid, and the actual dyeing is carried out at a temperature between 60° and 98° C. However, dyeing can also be carried out at the boiling point or at temperatures of up to 120° C. (under pressure).

The dyeings and prints produced with the compounds of the general formula (1) according to the invention are distinguished by very clear shades. In particular, the dyeings and prints on cellulose fiber materials have a good depth of color, as already mentioned, and moreover good fastness to light and very good fastness to wet processing, such as fastness to washing, fulling, water, seawater, over-dyeing and perspiration, and moreover good fastness to pleating, fastness to ironing and fastness to rubbing and a high resistance to steam. In addition, they exhibit very fast properties in respect of bleeding in the moist or wet state and in respect of soiling or staining of accompanying fabric or adjacent fabric, for example in printing. Fixed dyeings can be harmlessly stored on top of one another in the wet state without the color shade being changed.

The following examples serve to illustrate the invention. Unless otherwise indicated, the parts mentioned in the examples are parts by weight and the percentage data represent percentages by weight. Parts by weight bear the same relationship to parts by volume as kilograms to liters.

EXAMPLE 1

281 parts of 4-β-sulfatoethylsulfonyl-aniline are introduced into 1,000 parts of water and are dissolved by carefully adding 65 parts of sodium carbonate, the pH value being adjusted to 6.5 to 7.0. The mixture is stirred for a further 2 hours at this pH value, and 750 parts of ice and 255 parts of 31% strength aqueous hydrochloric acid are then added; 173 parts of 40% strength aqueous sodium nitrite solution are then allowed to run in, the mixture is subsequently stirred for a further 2 hours at 0° to 5° C. and excess nitrous acid is then destroyed by means of amidosulfonic acid. The solution of the secondary condensation product of in each case one mole of cyanuric chloride and 1-amino-8-naphthol-3,6-disulfonic acid and aniline-3-sulfonic acid is then allowed to run into the resulting diazonium salt suspension at a pH value of 6.0 to 6.5, while simultaneously introducing about 70 parts of sodium carbonate. This solution of the secondary condensation product is prepared as follows: 319 parts of 1-amino-8-naphthol-3,6-disulfonic acid are introduced into a mixture of 500 parts of water and 121 parts of 33% strength sodium hydroxide solution, while stirring; the pH value of the solution should then be 6.5 to 7.0. This solution is allowed to run into a suspension of 194 parts of cyanuric chloride, 800 parts of water and 800 parts of ice at a pH value of 3.0 to 3.8 in the course of one hour. Stirring is continued for a further hour at 0° to 5° C. and at the given pH value, which is maintained by sprinkling in 92 parts of sodium bicarbonate. 173 parts of aniline-3-sulfonic acid are introduced into the clear solution thus obtained, and 115 parts of sodium carbonate are then added in the course of one hour, whereupon the pH value is increased to 6.5 to 7.0. Stirring is continued at this pH value for a further 2 hours, the temperature being kept at 15° to 20° C.

After the diazonium suspension and the solution of the coupling component have been combined, the coupling mixture is subsequently stirred for a further 2 hours at room temperature, a pH value of 6.0 to 6.5 being maintained by sprinkling in 70 parts of sodium carbonate in portions. When the coupling has ended, the mixture is warmed to 50° C., 40 parts of kieselguhr are added, the solution is clarified (filtered), if appropriate 50 parts of disodium phosphate are added to the filtrate, and the filtrate is spray-dried.

A red powder which contains electrolyte and optionally contains the buffer substance mentioned, and which contains the alkali metal salt, in particular the sodium salt, of the compound of the formula

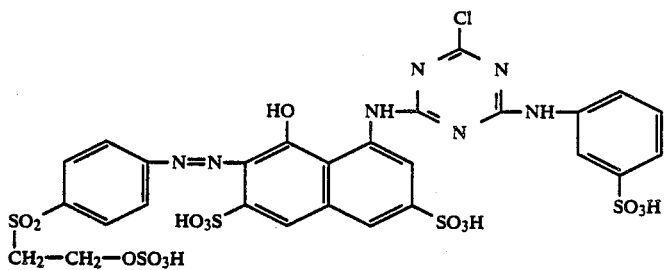

is obtained. This compound has very good dyestuff properties; it dyes the materials mentioned in the description, in particular wool from an acid bath or cellulose fiber materials in the presence of acid binding agents, in clear red shades with a very good buildup of color and a high degree of fixing by the application and fixing methods customary in industry for fiber-reactive dyestuffs. The dyeings have very good fastness to wet processing, such as, for example, an excellent fastness to washing, as well as a high resistance to steam and very good fastness to rubbing, and also are very fast in respect of their bleeding onto or soiling adjacent fabric.

EXAMPLE 2

A neutral aqueous solution of 297 parts of 4-β-thiosulfatoethylsulfonyl-aniline in 1,000 parts of water which has a pH value of 6.5 is prepared. About 600 parts of ice are then added, and about 200 parts of concentrated aqueous hydrochloric acid are also added, slowly and while stirring, until the pH value reaches 2. 173 parts of aqueous 40% strength sodium nitrite solution are then allowed to run in at a temperature of 0 to 5° C., the mixture is subsequently stirred for one hour and excess nitrous acid is destroyed by means of amidosulfonic acid. This resulting diazonium salt suspension is coupled with the aqueous solution of the secondary condensation product of in each case one mole of cyanuric chloride and 1-amino-8-naphthol-3,6-disulfonic acid and aniline-3-sulfonic acid, the procedure described in Example 1 being followed. After completion of the coupling reaction, clarification and isolation of the dyestuff, for example by spray-drying or salting out with sodium chloride, a red electrolyte-containing powder containing the appropriate alkali metal salt of the compound of the formula

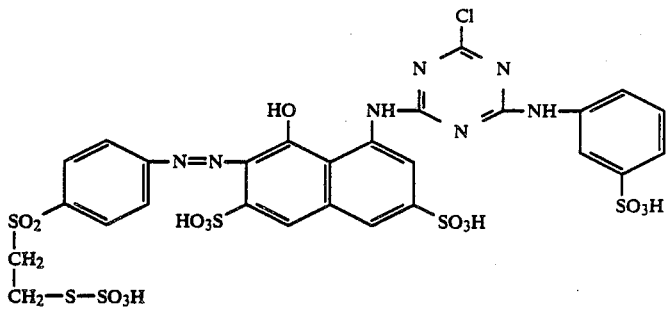

is obtained. This compound likewise has very good dyestuff properties and dyes polyamide fiber materials, such as, in particular, wool, and cellulose fiber materials in clear red shades with very good fastness properties to wet processing, such as have been mentioned, for example, for the dyestuff of Example 1, by the customary dyeing and fixing methods for dyestuffs which have a fiber-reactive group, in particular the β-thiosulfatoethylsulfonyl group.

EXAMPLE 3

195 parts of cyanuric chloride are dissolved in 800 parts by volume of acetone; this solution is added to a mixture of 1,300 parts of water and 1,300 parts of crushed ice as well as 20 parts by volume of 2N hydrochloric acid, while stirring thoroughly. A solution, with a pH value of 6.9 to 7.2, of 319 parts of 1-amino-8-naphthol-4,6-disulfonic acid, 65 parts of sodium carbonate and 2,000 parts of water is allowed to run into this resulting suspension in the course of 50 to 60 minutes, whilst stirring. The reaction of the cyanuric chloride with the aminonaphthol is carried out at a temperature between 0° and 5° C. and at a pH value of 3 to 5. The mixture is stirred until free amine can no longer be detected by a diazotization sample.

A diazonium salt suspension prepared according to Example 1 is added to the coupling component solution thus prepared. The mixture is stirred for 2 hours and the pH value is increased to 6.5 to 7.0 during this period by sprinkling in sodium carbonate in portions. Stirring is continued for a further hour at this pH value and at room temperature. 173 parts of aniline-4-sulfonic acid and, in portions, about 110 parts of sodium carbonate, carbonate, in order to keep the pH value at 5.0 to 6.0, are then added. This reaction solution is warmed to 50° C. and is kept at this temperature for one hour, while stirring. After cooling the reaction solution, the azo compound formed is precipitated by means of sodium chloride, filtered off and dried at 60° C. under reduced pressure. A red, electrolyte-containing powder which contains the sodium salt of the compound of the formula water and 300 parts of aqueous concentrated hydrochloric acid. The suspension of this aniline hydrochloride is adjusted to a temperature of about 0° C. by adding ice, and 173 parts of aqueous 40% strength sodium nitrite solution are then allowed to run in slowly, the temperature being kept at 0° to 5° C. The mixture is stirred at this temperature for a further 2 hours and excess nitrite is then destroyed by means of amidosulfonic acid.

The diazonium salt suspension thus prepared is added to the solution of the coupling component. Sodium carbonate is slowly added in portions in the course of about 2 hours, whilst stirring further, until a pH value of 6.5 to 7.0 is obtained, this pH value being maintained for one hour, at room temperature and whilst stirring further. 173 parts of aniline-3-sulfonic acid are then added, and about 110 parts of sodium carbonate are added in portions, in order to keep the pH value at 5 to 6 during the condensation reaction which occurs between the anilinesulfonic acid and the dichlorotriazinyl com-

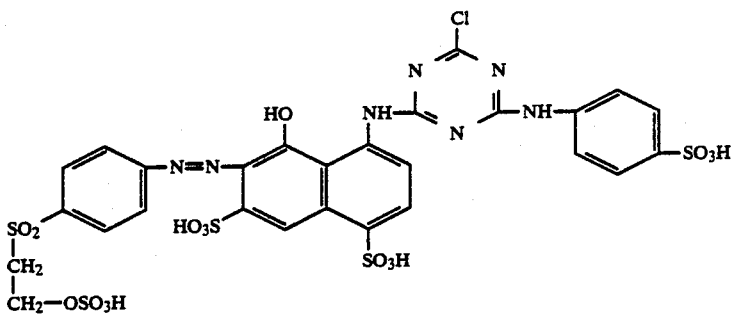

is obtained. This azo compound is outstandingly suitable for use as a dyestuff. As a result of its fiber-reactive properties it gives, for example, deep red dyeings on cotton fibers from an aqueous-alkaline liquor by a customary exhaustion or padding process. The dyeings have very good fastness to washing and light.

pound. The reaction mixture is warmed to 50° C., stirred for a further hour at this temperature and then spray-dried. A red, electrolyte-containing powder which contains the alkali metal salt, predominantly the sodium salt, of the compound of the formula

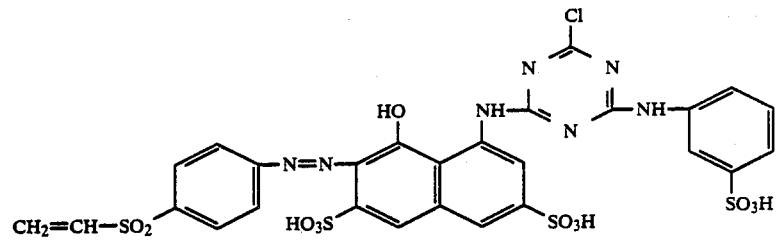

EXAMPLE 4

The following solution of a coupling component is prepared: a solution of 195 parts of cyanuric chloride in 800 parts by volume of acetone is mixed with a mixture of 1,200 parts of water, 1,200 parts of crushed ice and 20 parts by volume of aqueous 2N hydrochloric acid. A solution, with a pH value of about 7, of 319 parts of 1-amino-8-naphthol-3,6-disulfonic acid, 65 parts of sodium carbonate and 2,000 parts of water is allowed to run into this suspension in the course of 50 to 60 minutes. The condensation reaction is carried out at a temperature between zero and 5° C. and at a pH value between 3 and 5. The mixture is stirred until free amine can no longer be detected by a diazotization sample.

A diazonium salt suspension is prepared by stirring 190 parts of 4-vinylsulfonyl-aniline into 500 parts of is obtained. This azo compound likewise has very good dyestuff properties and dyes, in particular, cellulose fiber materials in strong red shades with very good fastness properties, which correspond to those of the dyestuff of Example 1, obtained by the application and fixing methods customary for reactive dyestuffs.

EXAMPLES 5 TO 11

Other azo compounds of the general formula (1), according to the invention, which are outstandingly suitable for use as dyestuffs can be prepared by one of the procedures according to the invention, for example by the variants described in the above examples. They dye materials, in particular fiber materials of natural or synthetic polyamide or natural or regenerated cellulose fibers, with a good depth of color in the color shades given for these dyestuffs in the following table; the fastness to light and fastness to wet processing, which the dyeings and prints produced with the dyestuffs have, are likewise good. The compounds of the general formula (1) according to the invention which are given in the following tabular examples are characterized by the radical —Y and by the position of the 2nd sulfo group in the naphthalene radical, that is to say in the m-position or p-position relative to the acylamino radical, in accordance with the following general formula (7):

[Structure (7): naphthalene-based azo compound with HO, HO₃S, SO₃H, NH—triazine—Y substituents, and phenyl-SO₂-CH₂-CH₂-OSO₃H group]

| Example | in which —Y is | in which —SO₃H is in the | Colour shade of the dyeing |
|---|---|---|---|
| 5 | —NH—C₆H₄—SO₃H (para) | m-position | bluish-tinged red |
| 6 | —NH—C₆H₄—SO₃H (meta) | p-position | red |
| 7 | —NH—C₆H₄—SO₃H (ortho) | p-position | red |
| 8 | —NH—C₆H₃(SO₃H)₂ | m-position | bluish-tinged red |
| 9 | —NH—C₆H₄—COOH | m-position | bluish-tinged red |
| 10 | —N(CH₃)—CH₂—CH₂—SO₃H | p-position | red |
| 11 | —NH—CH₂—COOH | p-position | red |

We claim:
1. An azo compound which has the formula

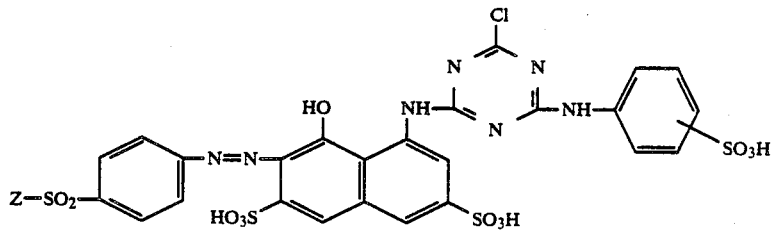

in which X is phenyl substituted by one or two sulfo groups, and Z is vinyl, β-thiosulfatoethyl or β-sulfatoethyl, or an alkali metal of said azo compound.

2. An azo compound which has the formula

[Structure: Z—SO₂—C₆H₄—N=N— naphthalene (HO, HO₃S, SO₃H) —NH—triazine(Cl)—NH—C₆H₄—SO₃H]

in which Z is vinyl, β-thiosulfatoethyl or β-sulfatoethyl, or an alkali metal of said azo compound.

3. The azo compound according to claim 1 of the formula

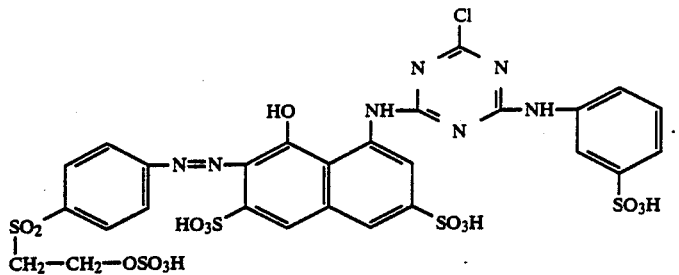
or a salt thereof.
4. The azo compound according to claim 1 of the formula
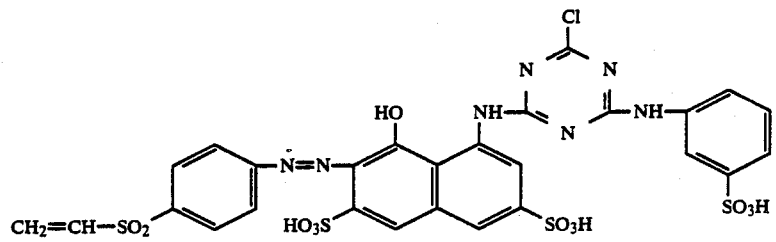
or a salt thereof.
5. The azo compound according to claim 1 of the formula
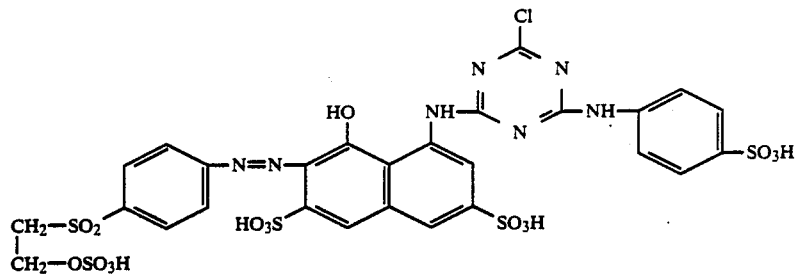
or a salt thereof.
* * * * *